United States Patent
Yu et al.

(10) Patent No.: US 9,875,405 B2
(45) Date of Patent: Jan. 23, 2018

(54) VIDEO MONITORING METHOD, VIDEO MONITORING SYSTEM AND COMPUTER PROGRAM PRODUCT

(71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Gang Yu, Beijing (CN); Chao Li, Beijing (CN); Zeyuan Shang, Beijing (CN); Qizheng He, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/888,369

(22) PCT Filed: Apr. 29, 2015

(86) PCT No.: PCT/CN2015/077783
§ 371 (c)(1),
(2) Date: Sep. 1, 2016

(87) PCT Pub. No.: WO2016/172870
PCT Pub. Date: Nov. 3, 2016

(65) Prior Publication Data
US 2016/0379049 A1 Dec. 29, 2016

(51) Int. Cl.
| G06K 9/00 | (2006.01) |
| G06K 9/62 | (2006.01) |
| G06T 7/11 | (2017.01) |
| G06T 7/143 | (2017.01) |
| G06T 7/215 | (2017.01) |
| G06T 7/194 | (2017.01) |
| G06K 9/32 | (2006.01) |

(Continued)

(52) U.S. Cl.
CPC ..... G06K 9/00577 (2013.01); G06K 9/00778 (2013.01); G06K 9/00785 (2013.01);
(Continued)

(58) Field of Classification Search
CPC ................. G06K 9/00; G06T 7/00
(Continued)

(56) References Cited

U.S. PATENT DOCUMENTS 8,280,165 B2 * 10/2012 Meng ............. G06T 7/194
382/173
8,797,405 B2 * 8/2014 Cobb ............. G06K 9/00771
348/143

(Continued)

FOREIGN PATENT DOCUMENTS

CN 102982598 3/2013
CN 103268470 8/2013

(Continued)

OTHER PUBLICATIONS

International Search Report and Written Opinion issued in the corresponding International application No. PCT/CN2015/077783, dated Jan. 18, 2016, 18 pages.

*Primary Examiner* — Abolfazl Tabatabai
(74) *Attorney, Agent, or Firm* — Hamre, Schumann, Mueller & Larson, P.C.

(57) ABSTRACT

The present disclosure relates to a video monitoring method, a video monitoring system and a computer program product. The video monitoring method comprises: obtaining video data collected by a video data collecting apparatus; and based on pre-set scene information and the video data, performing determination and statistics of monitored objects in a scene to be monitored corresponding to the scene information.

19 Claims, 9 Drawing Sheets

(51) Int. Cl.
*G06K 9/46* (2006.01)
*H04N 5/225* (2006.01)

(52) U.S. Cl.
CPC ......... *G06K 9/3233* (2013.01); *G06K 9/4604* (2013.01); *G06K 9/4633* (2013.01); *G06K 9/6298* (2013.01); *G06T 7/11* (2017.01); *G06T 7/143* (2017.01); *G06T 7/194* (2017.01); *G06T 7/215* (2017.01); *G06K 9/00369* (2013.01); *G06T 2207/10016* (2013.01); *G06T 2207/20021* (2013.01); *G06T 2207/20076* (2013.01); *G06T 2207/30196* (2013.01); *G06T 2207/30232* (2013.01); *G06T 2207/30236* (2013.01)

(58) Field of Classification Search
USPC ........ 382/103, 107, 236; 348/169, 170, 171, 348/172, 352
See application file for complete search history.

(56) References Cited

U.S. PATENT DOCUMENTS 9,176,987 B1 * 11/2015 Peng ................. G06F 17/30253
2013/0223688 A1    8/2013 Golan et al.

FOREIGN PATENT DOCUMENTS

| CN | 103986910 | 8/2014 |
| CN | 104318263 | 1/2015 |

* cited by examiner

VIDEO MONITORING METHOD, VIDEO MONITORING SYSTEM AND COMPUTER PROGRAM PRODUCT

TECHNICAL FIELD OF THE DISCLOSURE

The present disclosure relates to the field of video monitoring, and more specifically, to a video monitoring method, a video monitoring system and a computer program product.

BACKGROUND

Current image or video monitoring usually needs to rely on manual detection and processing of operators. Therefore, although many scenes are covered by cameras, lots of manpower is needed to perform processing and monitoring because there is not intelligent video monitoring method. In addition, when the coverage range of monitoring cameras increases, it is hard to perform efficient processing or respond to emergencies.

Intelligent video monitoring can automatically estimate density of people in a scene and monitor people flow or traffic flow in a video scene in real time based on video data of cameras. Intelligent monitoring has a very wide range of application scenarios. For example, in the aspect of city security, with monitoring of density of people, it is possible to provide alarm when the density of people is too large and deal with the situation in time, to avoid possible emergencies. It is possible to provide crowding situations in real time and provide advises on travel to drivers by performing statistics of number of cars in city roads. It is possible to provide some consumption suggestions and analyses to merchants by performing statistics on people flow in a mall.

Existing intelligent monitoring method for people flow mainly have two approaches. The first one is based on a passenger detection algorithm, but this approach has low accuracy of statistic data for regions with high density of people or cases of severe blocking. In addition, the passenger detection algorithm is time costing itself, and thus cannot achieve the purpose of real-time monitoring. The other approach is independent of passengers. It extracts some features (e.g., edge, texture, or the like) of current image, and performs regression analysis based on those features and some training data to obtain number of passengers in current region. This type of approach usually has low accuracy. Its result is acceptable when density of passengers is large, but when the number of passengers decreases, its error will be large. In addition, the single regression method can hardly differentiate a passenger and a vehicle, and thus have limited application scenarios.

SUMMARY

The present disclosure is provided in view of the above problems. The present disclosure provides a video monitoring method based on a depth video, a video monitoring system and a computer program product, which can perform accurate statistics and analysis on density of people, traffic flow and number of people across a line in current scene in real time.

According to an embodiment of the present disclosure, there is provided a video monitoring method comprising: obtaining video data collected by a video data collecting apparatus; and based on pre-set scene information and the video data, performing determination and statistics of monitored objects in a scene to be monitored corresponding to the scene information.

In addition, in the video monitoring method according to an embodiment of the present disclosure, pre-setting the scene information comprises: configuring the scene to be monitored and setting a monitored region and a monitored line in the scene to be monitored.

In addition, in the video monitoring method according to an embodiment of the present disclosure, pre-setting the scene information further comprises: performing probability estimation on each pixel in the monitored region based on a predetermined model to obtain a probability model for each pixel for determining foreground data and background data in the video data.

In addition, in the video monitoring method according to an embodiment of the present disclosure, pre-setting the scene information further comprises: marking positions of multiple monitored objects of a first type in the monitored region, and determining weight of the monitoring object of the first type in each position with respect to area of the monitored region.

In addition, the video monitoring method according to an embodiment of the present disclosure further comprises: determining a foreground region and a background region in the monitored region based on the probability model and eliminating shadow regions in the foreground region to obtain a monitored foreground region as a monitored target.

In addition, the video monitoring method according to an embodiment of the present disclosure further comprises: dividing the monitored foreground region into multiple monitored foreground sub-regions which are not connected to each other.

In addition, in the video monitoring method according to an embodiment of the present disclosure, performing determination and statistics of monitored objects in a scene to be monitored corresponding to the scene information based on the scene information and the video data comprises: performing edge detection on each of the multiple monitored foreground sub-regions to obtain profile information of the monitoring foreground sub-region, and determining the monitoring object corresponding to the profile information as a monitoring object of a second type if the profile information satisfies a predetermined profile condition.

In addition, in the video monitoring method according to an embodiment of the present disclosure, performing determination and statistics of monitored objects in a scene to be monitored corresponding to the scene information based on the scene information and the video data further comprises: eliminating a second region corresponding to the monitoring object of the second type from each of the multiple monitored foreground sub-regions to obtain a first region corresponding to the monitored objects of the first type, and determining a first number of the monitored objects of the first type in each of the multiple monitored foreground sub-regions based on area of the first region and the weight corresponding to the monitored objects of the first type.

In addition, the video monitoring method according to an embodiment of the present disclosure further comprises: generating warning information when the first number is larger than a predetermined threshold.

In addition, in the video monitoring method according to an embodiment of the present disclosure, performing determination and statistics of monitored objects in a scene to be monitored corresponding to the scene information based on the scene information and the video data further comprises: for a first direction perpendicular to the monitored line, based on the motion speed of the monitoring object of the first type in the monitored line, determining area of the first region passing the monitored line in the first direction during a predetermined time period, and based on the weight of the monitored objects of the first type in the monitored line, determining the number of the monitored objects of the first type passing the monitored line in the first direction during the predetermined time period.

According to another embodiment of the present disclosure, there is provided a video monitoring system comprising: a processor; a memory; and computer program instructions stored in the memory, which, when executed by the processor, perform steps of: obtaining video data collected by a video data collecting apparatus; and based on pre-set scene information and the video data, performing determination and statistics of monitored objects in a scene to be monitored corresponding to the scene information.

In addition, in the video monitoring system according to another embodiment of the present disclosure, the computer program instructions performs the step of pre-setting the scene information when executed by the processor, and the step of pre-setting the scene information comprises: configuring the scene to be monitored and setting a monitored region and a monitored line in the scene to be monitored.

In addition, in the video monitoring system according to another embodiment of the present disclosure, the step of pre-setting the scene information performed by the computer program instructions when executed by the processor further comprises: performing probability estimation on each pixel in the monitored region based on a predetermined model to obtain a probability model for each pixel for determining foreground data and background data in the video data.

In addition, in the video monitoring system according to another embodiment of the present disclosure, the step of pre-setting the scene information performed by the computer program instructions when executed by the processor further comprises: marking positions of multiple monitored objects of a first type in the monitored region, and determining weight of the monitoring object of the first type in each position with respect to area of the monitored region.

In addition, in the video monitoring system according to another embodiment of the present disclosure, the computer program instructions, when executed by the processor, further perform a step of: determining a foreground region and a background region in the monitored region based on the probability model and eliminating shadow regions in the foreground region to obtain a monitored foreground region as a monitored target.

In addition, in the video monitoring system according to another embodiment of the present disclosure, the computer program instructions, when executed by the processor, further perform a step of: dividing the monitored foreground region into multiple monitored foreground sub-regions which are not connected to each other.

In addition, in the video monitoring system according to another embodiment of the present disclosure, the step of performing determination and statistics of monitored objects in a scene to be monitored corresponding to the scene information based on the scene information and the video data performed by the computer program instructions when executed by the processor comprises: performing edge detection on each of the multiple monitored foreground sub-regions to obtain profile information of the monitoring foreground sub-region, and determining the monitoring object corresponding to the profile information as a monitoring object of a second type if the profile information satisfies a predetermined profile condition.

In addition, in the video monitoring system according to another embodiment of the present disclosure, the step of performing determination and statistics of monitored objects in a scene to be monitored corresponding to the scene information based on the scene information and the video data performed by the computer program instructions when executed by the processor further comprises: eliminating a second region corresponding to the monitoring object of the second type from each of the multiple monitored foreground sub-regions to obtain a first region corresponding to the monitored objects of the first type, and determining a first number of the monitored objects of the first type in each of the multiple monitored foreground sub-regions based on area of the first region and the weight corresponding to the monitored objects of the first type.

In addition, in the video monitoring system according to another embodiment of the present disclosure, the computer program instructions, when executed by the processor, further perform a step of: generating warning information when the first number is larger than a predetermined threshold.

In addition, in the video monitoring system according to another embodiment of the present disclosure, the step of performing determination and statistics of monitored objects in a scene to be monitored corresponding to the scene information based on the scene information and the video data performed by the computer program instructions when executed by the processor further comprises: for a first direction perpendicular to the monitored line, based on the motion speed of the monitoring object of the first type in the monitored line, determining area of the first region passing the monitored line in the first direction during a predetermined time period, and based on the weight of the monitored objects of the first type in the monitored line, determining the number of the monitored objects of the first type passing the monitored line in the first direction during the predetermined time period.

According to yet another embodiment of the present disclosure, there is provided a computer program product comprising a computer readable storage medium on which computer program instructions are stored, wherein the computer program instructions, when executed by the processor, perform steps of obtaining video data collected by a video data collecting apparatus; and based on pre-set scene information and the video data, performing determination and statistics of monitored objects in a scene to be monitored corresponding to the scene information.

It is understood that both the above general description and the following detailed description are illustrative, and are intended to provide further explanation on the technologies to be claimed.

BRIEF DESCRIPTION OF THE DRAWINGS

The above and other objects, features and advantages of the present disclosure will become more apparent by more detailed descriptions of embodiments of the present disclosure in connection with figures. The figures are used to provide further understanding of embodiments of the present disclosure, constitute part of the specification, explain the present disclosure together with embodiments of the present disclosure, but not limit the present disclosure. In the figures, the same reference numbers usually represent the same elements or steps.

DETAILED DESCRIPTION

In order to make objects, technical solutions and advantages of the present disclosure more obvious, exemplary embodiments of the present disclosure will be described in detail with reference to the figures in the following. Obviously, the described embodiments are only part embodiments of the present disclosure, but not all the embodiments. It should be understood that the present disclosure is not limited by exemplary embodiments described herein. All other embodiments obtained by those skilled in the art based on the embodiments described in the present disclosure without creative work fall in the protection scope of the present disclosure.

In the following, preferable embodiments of the present disclosure will be described in detail with reference to the figures.

Figure 1:
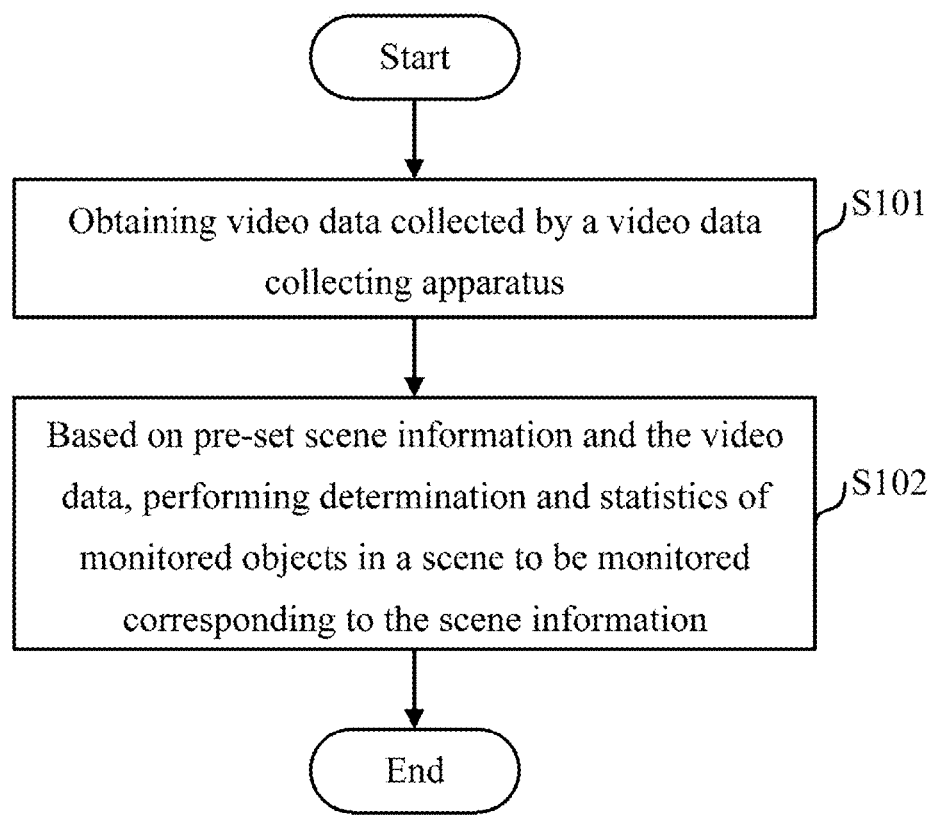
FIG. 1 is a flowchart illustrating a video monitoring method according to an embodiment of the present disclosure.

FIG. 1 is a flowchart illustrating a video monitoring method according to an embodiment of the present disclosure. As shown in FIG. 1, a video monitoring method according to an embodiment of the present disclosure comprises the following steps.

In step S101, video data collected by a video collecting apparatus is obtained. In an embodiment of the present disclosure, the video collecting apparatus is camera (such as a RGB video camera or a depth video camera) that can obtain video data of a subject to be captured. The video collecting apparatus can be installed in a look-down perspective. Obtaining video data collected by a video collecting apparatus comprises, but is not limited to, receiving video data sent from the video collecting apparatus via a wired or wireless manner after the video collected apparatus arranged separately in physical position collects the video data. Alternatively, the video collecting apparatus can be physically located at the same position or even inside the same housing with other modules or components in the video monitoring system. Other modules or components in the video monitoring system receive video data sent from the video collecting apparatus via an internal bus. Then the process enters step S102.

In step S102, based on pre-set scene information and the video data, determination and statistics of monitored objects in a scene to be monitored corresponding to the scene information are performed. In an embodiment of the present disclosure, the pre-set scene information comprises, but is not limited to, regions of interest (ROI) and lines of interest (LOI) in the scene to be monitored. The region of interest (ROI) is a region in which statistics of the number of people (or number of vehicles) needs to be performed in the scene. The line of interest (LOI) is a virtual line in which statistics of people flow needs to be performed in the scene. In the following, the processing of pre-setting the scene information and the processing of determination and statistics of monitored objects in the scene will be further described in detail.

The above video monitoring method according to an embodiment of the present disclosure can perform accurate statistics and analysis on density of people, traffic flow and number of people across a line in current scene in real time.

Next, a video monitoring system for performing the above video monitoring method will be further described with reference to FIG. 2.

Figure 2:
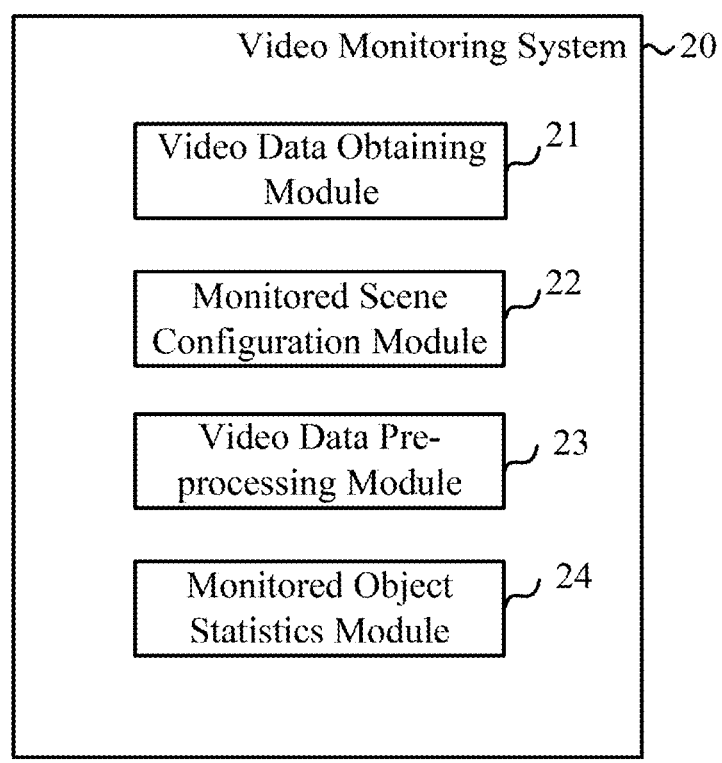
FIG. 2 is a functional block diagram illustrating a video monitoring system according to an embodiment of the present disclosure.

FIG. 2 is a functional block diagram of a video monitoring system according to an embodiment of the present disclosure. As shown in FIG. 2, the video monitoring system 20 according to an embodiment of the present disclosure comprises a video data obtaining module 21, a monitored scene configuration module 22, a video data pre-processing module 23 and a monitored object statistics module 24. The video data obtaining module 21, the monitored scene configuration module 22, the video data pre-processing module 23 and the monitored object statistics module 24 can for example be configured by hardware (server, dedicated computer, or the like), software, firmware, or any suitable combination of the above.

In particular, the video data obtaining module 21 is configured to obtain the video data. In an embodiment of the present disclosure, the video data obtaining module 21 can be a video collecting apparatus comprising a RGB video camera that can obtain video data of a subject to be captured. In another embodiment of the present disclosure, the video data obtaining module 21 can be a video collecting apparatus comprising a depth camera (depth video camera) that can obtain depth information of a subject to be captured. The video collecting apparatus 21 can be physically separated from, or physically located at the same position or even inside the same housing with the subsequent monitored scene configuration module 22, the video data pre-processing module 23 and the monitored object statistics module 24. In the case that the video data obtaining apparatus 21 is physically separated from the subsequent monitored scene configuration module 22, the video data pre-processing module 23 and the monitored object statistics module 24, the video data obtaining apparatus 21 further transmits the depth video data obtained by the video collecting apparatus to the subsequent modules via a wired or wireless manner. In the case that the video data obtaining apparatus 21 is physically located at the same position or even inside the same housing with the subsequent monitored scene configuration module 22, the video data pre-processing module 23 and the monitored object statistics module 24, the video data obtaining module 21 transmits the depth video data obtained by the video collecting apparatus to the subsequent modules via an internal bus. The video data can be RGB chromatic video data or RGBD video data comprising depth information. Before the video data is transmitted via a wired or wireless manner or via an internal bus, its predetermined format can be encoded and compressed as a video data packet to reduce communication quantity and bandwidth needing to be occupied by the transmission.

The monitored scene configuration module 22 configures the scene to be monitored, and sets a monitored region and a monitored line in the scene to be monitored. In particular, an operator of the video monitoring system 20 according to an embodiment of the present disclosure fixes the video data obtaining module 21 in a look-down perspective, and then sets a monitored region and a monitored line in the monitoring scene captured by the video data obtaining module 21. In an embodiment of the present disclosure, the monitored region is the region of interest (ROI) in the scene to be monitored as described in the above, i.e., the region in which statistics of number of people (number of vehicles) needs to be performed. In an embodiment of the present disclosure, the monitored region can be set as all regions in the whole monitoring scene captured by the video data obtaining module 21, or can be set as part specific regions in the monitoring scene. The monitored line is the line of interest (LOI) in the scene to be monitored described in the above. The line of interest (LOI) is a virtual line in which statistics of a passenger flow needs to be performed, which can be parallel to the ground plane in the monitoring scene. In an embodiment of the present disclosure, the monitored line is a straight line parallel to the ground plane in the plane where for example an entry or exit is located in the monitoring scene. Performing statistics of people flow passing the monitored line obtains the number of people entering or getting out of the entry or exit.

Further, the monitored scene configuration module 22 performs probability estimation on each pixel in the monitored region based on a predetermined model to obtain a probability model for each pixel. In an embodiment of the present disclosure, the monitored scene configuration module 22 performs probability estimation on a single pixel by using a multi-Gaussian model to obtain the probability model for each pixel. Foreground data and background data are determined by this model for the obtained video data. After configuring the scene to be monitored, the probability model is the probability that the video data is the background data. Since the background is relatively constant, and the foreground is arbitrary, the data different from the background data is the foreground data.

Furthermore, the monitored scene configuration module 22 marks positions of multiple monitored objects of a first type in the monitored region, and determines weight of the monitoring object of the first type in each position with respect to area of the monitored region. In an embodiment of the present disclosure, the monitoring object of the first type can be a passenger, and the object of the second type to be described in the following can be a vehicle. In an embodiment of the present disclosure, the positions of multiple passengers (the monitored objects of the first type) are manually marked in the monitoring area according the obtained video data. The weight of the passenger in each position is estimated by the regression algorithm. In other words, the weight is the area occupied by one passenger in this position in the video image. It is easy to understand that the weight is related to the relative position of the video camera to the scene. Actually, the farther the passenger is away from the video camera, the smaller the size occupied by the passenger in the image, and therefore, the larger weight is given to this position.

The video data pre-processing module 23 performs pre-processing of video data for the video data obtained by the video data processing obtaining module 21. In an embodiment of the present disclosure, the video data pre-processing model 23 determines a foreground region and a background region in the monitored region based on the probability model determined by the monitoring scene configuration model 22 and eliminates shadow regions in the foreground region to obtain a monitored foreground region as a monitored target. Further, the video data pre-processing module 23 divides the monitored foreground region into multiple monitored foreground sub-regions which are not connected to each other.

The monitored object statistics module 24 performs determination and statistics of monitored objects in the scene based on the scene information set by the monitored scene configuration module 22 and the video data obtained by the video data obtaining module 21. In an embodiment of the present disclosure, the monitored object statistics module 24 performs edge detection on each of the multiple monitored foreground sub-regions obtained by the video data pre-processing module 23 to obtain profile information of the monitoring foreground sub-region, and determines the monitoring object corresponding to the profile information as a monitoring object of a second type (vehicle) if the profile information satisfies a predetermined profile condition. Further, the monitored object statistics module 24 eliminates a second region corresponding to the monitoring object of the second type from each of the multiple monitored foreground sub-regions to obtain a first region corresponding to the monitored objects of the first type (passengers), and determines a first number of the monitored objects of the first type in each of the multiple monitored foreground sub-regions based on the area of the first region and the weight corresponding to the monitored objects of the first type determined by the monitored scene configuration module 22. Furthermore, when the first number is larger than a predetermined threshold, the monitored object statistics module 24 generates warning information. In another embodiment of the present disclosure, the monitored object statistics module 24 performs statistics of people flow with respect to the monitored line set by the monitored scene configuration module 22. For a first direction perpendicular to the monitored line, the monitored object statistics module 24 determines the area of the first region passing the monitored line in the first direction during a predetermined time period based on the motion speed of the monitoring object of the first type in the monitored line, and based on the weight of the monitored objects of the first type in the monitored line, determines the number of the monitored objects of the first type passing the monitored line in the first direction during the predetermined time period.

In the following, each specific step procedure of a video monitoring method according to an embodiment of the present disclosure performed by a respective module of a video monitoring system according to an embodiment of the present disclosure will be further described in detail with reference to figures.

Figure 3:
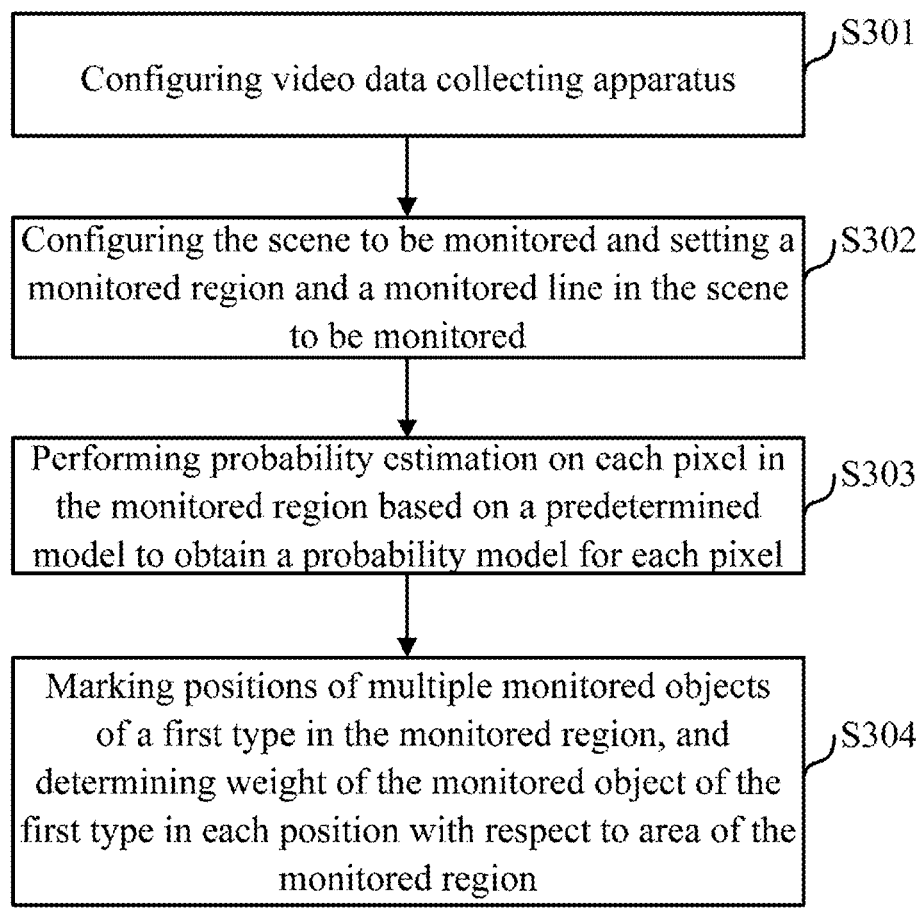
FIG. 3 is a flowchart for further illustrating setting scene information in a video monitoring method according to an embodiment of the present disclosure.

FIG. 3 is a flowchart for further illustrating setting scene information in a video monitoring method according to an embodiment of the present disclosure. As shown in FIG. 3, the process flow of setting the scene information in the video monitoring method according to an embodiment of the present disclosure comprises the following steps.

In step S301, the video data collecting apparatus is configured. A camera as the video collecting apparatus is installed in a scene to be monitored. Generally, the camera is installed at a height of 2-3.5 meters, and its perspective is looking down upon the ground. Then, the process enters step S302.

In step S302, the scene to be monitored is configured and a monitored region and a monitored line in the scene to be monitored are set. As described in the above, the monitored region is a region in which statistics of number of people (number of vehicles) needs to be performed. In an embodiment of the present disclosure, the monitored region can be set as all regions in the whole monitoring scene captured by the video data obtaining module 21, or can be set as part specific regions in the monitoring scene. The monitored line is a virtual line in which statistics of a passenger flow needs to be performed, which can be parallel to the ground plane in the monitoring scene. In an embodiment of the present disclosure, the monitored line is a straight line parallel to the ground plane in the plane where for example an entry or exit is located in the monitoring scene. Performing statistics of people flow passing the monitored line obtains the number of people entering or getting out of the entry or exit. Then, the process enters step S303.

In step S303, probability estimation on each pixel in the monitored region is performed based on a predetermined model to obtain a probability model for each pixel. In an embodiment of the present disclosure, the probability estimation on a single pixel is performed by using a multi-Gaussian model to obtain the probability model for each pixel. Foreground data and background data are determined by this model for the obtained video data. After configuring the scene to be monitored, the probability model is the probability that the video data is the background data. Then, the process enters step S304.

In step S304, positions of multiple monitored objects of a first type in the monitored region are marked, and weight of the monitoring object of the first type in each position with respect to area of the monitored region is determined. In an embodiment of the present disclosure, the monitoring object of the first type can be a passenger, and the object of the second type to be described in the following can be a vehicle. In an embodiment of the present disclosure, the positions of multiple passengers (the monitored objects of the first type) are manually marked in the monitoring area according to the obtained video data. The weight of the passenger in each position is estimated by the regression algorithm. In other words, the weight is the area occupied by one passenger in this position in the video image. It is easy to understand that the weight is related to the relative position of the video camera to the scene. Actually, the farther the passenger is away from the video camera, the smaller the size occupied by the passenger in the image, and therefore, the larger weight is given to this position.

With the above process flow for setting the scene information in steps S301 to S304, after installing the video data collecting apparatus, the monitored region and the monitored line to be monitored, the probability model for determining the foreground and the background, and the area weight of the monitoring object of the first type in the monitoring area are determined. The above respective parameters are used for later real-time monitoring based on the video data.

Figure 4:
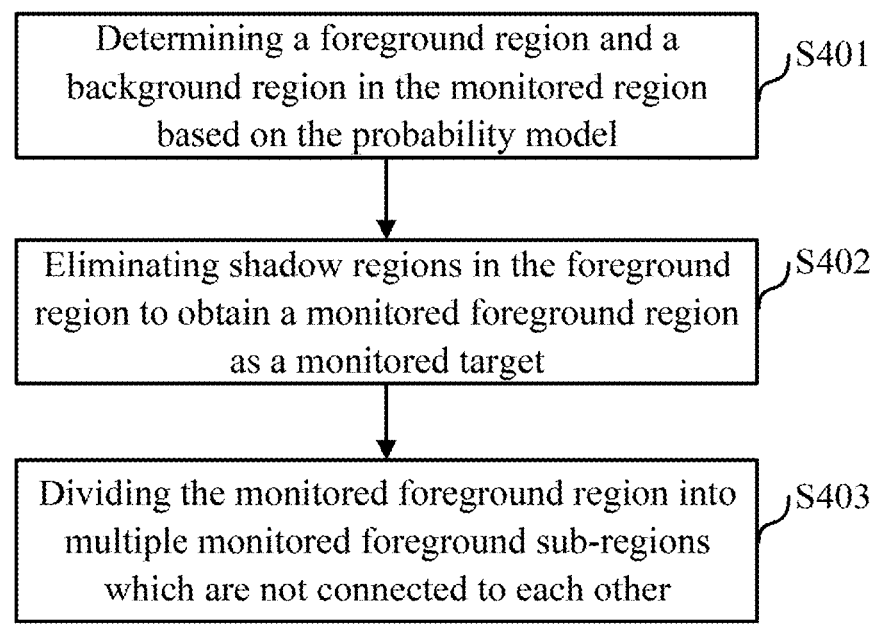
FIG. 4 is a flowchart for further illustrating pre-processing of the video data in a video monitoring method according to an embodiment of the present disclosure.

FIG. 4 is a flowchart for further illustrating pre-processing of video data in a video monitoring method according to an embodiment of the present disclosure. As shown in FIG. 4, the process flow of pre-processing of video data in the video monitoring method according to an embodiment of the present disclosure comprises the following steps.

In step S401, a foreground region and a background region in the monitored region are determined based on the probability model. After obtaining the video data to be monitored, the foreground data and the background data in the video data (i.e., the foreground region and the background region in the monitored region) are determined by using the probability model determined in the above step S303. Then, the process enters step S402.

In step S402, shadow regions in the foreground region are eliminated to obtain a monitored foreground region as a monitored target. In an embodiment of the present disclosure, if there is shadow in the monitored region, the shadow part in the foreground region is eliminated by a shadow detection method. The shadow detection method can be based on two types of physical principles. One type of physical principle is that light brightness in the shadow part is lower than the light brightness in the non-shadow part. The other type of physical principle is that the shadow part would preserve the texture information of the ground itself. The shadow part is found first by the shadow detection method, and then eliminated from the foreground region. Then, the process enters step S403.

In step S403, the monitored foreground region is divided into multiple monitored foreground sub-regions which are not connected to each other. It is possible to avoid error caused by estimating number of people in a large foreground region by dividing the monitored foreground region into multiple monitored foreground sub-regions which are not connected to each other.

With the above process flow of pre-processing of video data in the steps S401 to S403, the obtained video data to be monitored is pre-processed for further statistic analysis. In the following, the schematic effect of the pre-processing of the video data will be described with reference to the figures.

Figure 5A:
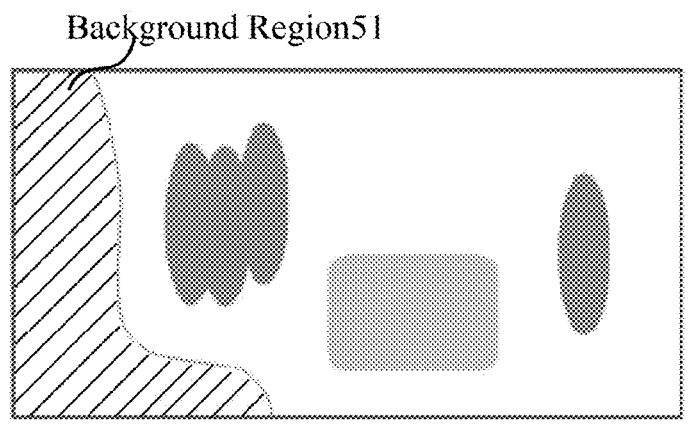
FIGS. 5A to 5C are schematic diagrams for illustrating pre-processing of the video data in a video monitoring method according to an embodiment of the present disclosure.
Figure 5B:
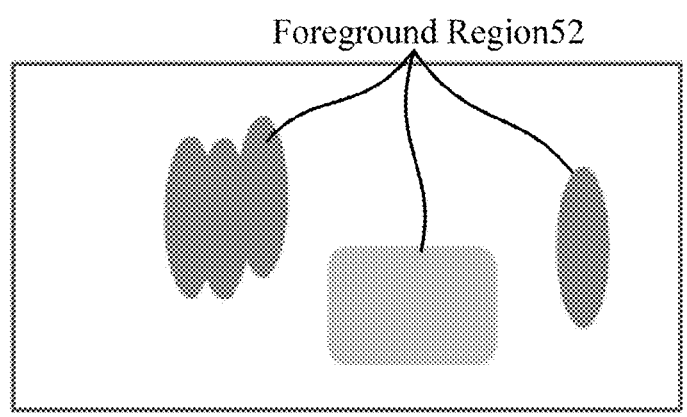
Figure 5C:
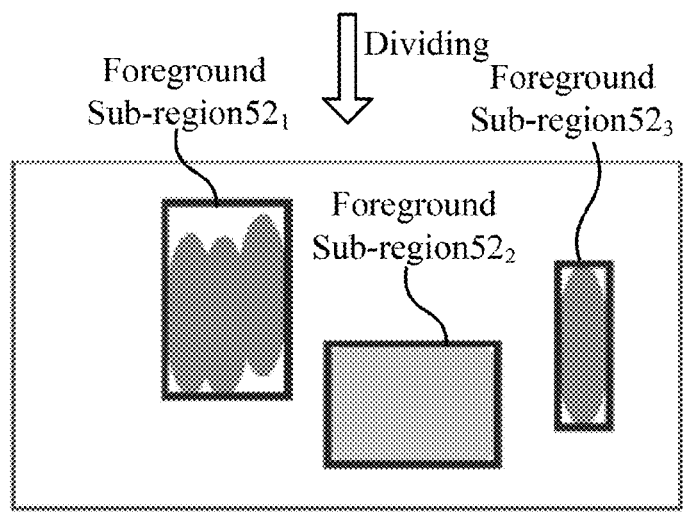

FIGS. 5A to 5C are schematic diagrams for illustrating pre-processing of the video data in a video monitoring method according to an embodiment of the present disclosure.

As shown in FIG. 5A, the background region 51 in the monitored region is determined based on the probability model.

Further, based on the determined background region 51 and corresponding elimination of the shadow part, the foreground region is extracted. As shown in FIG. 5B, the foreground region 52 for further statistic analysis for video monitoring is extracted.

Furthermore, dividing operation is performed on the foreground region 52. As shown in FIG. C, the extracted foreground region 52 is divided into multiple monitored foreground sub-regions $52_1$, $52_2$ and $52_3$.

With the pre-processing of the video data as shown in FIGS. 5A to 5C, the obtained multiple monitored foreground sub-regions $52_1$, $52_2$ and $52_3$ will be used for statistic analysis of the monitoring object.

Figure 6:
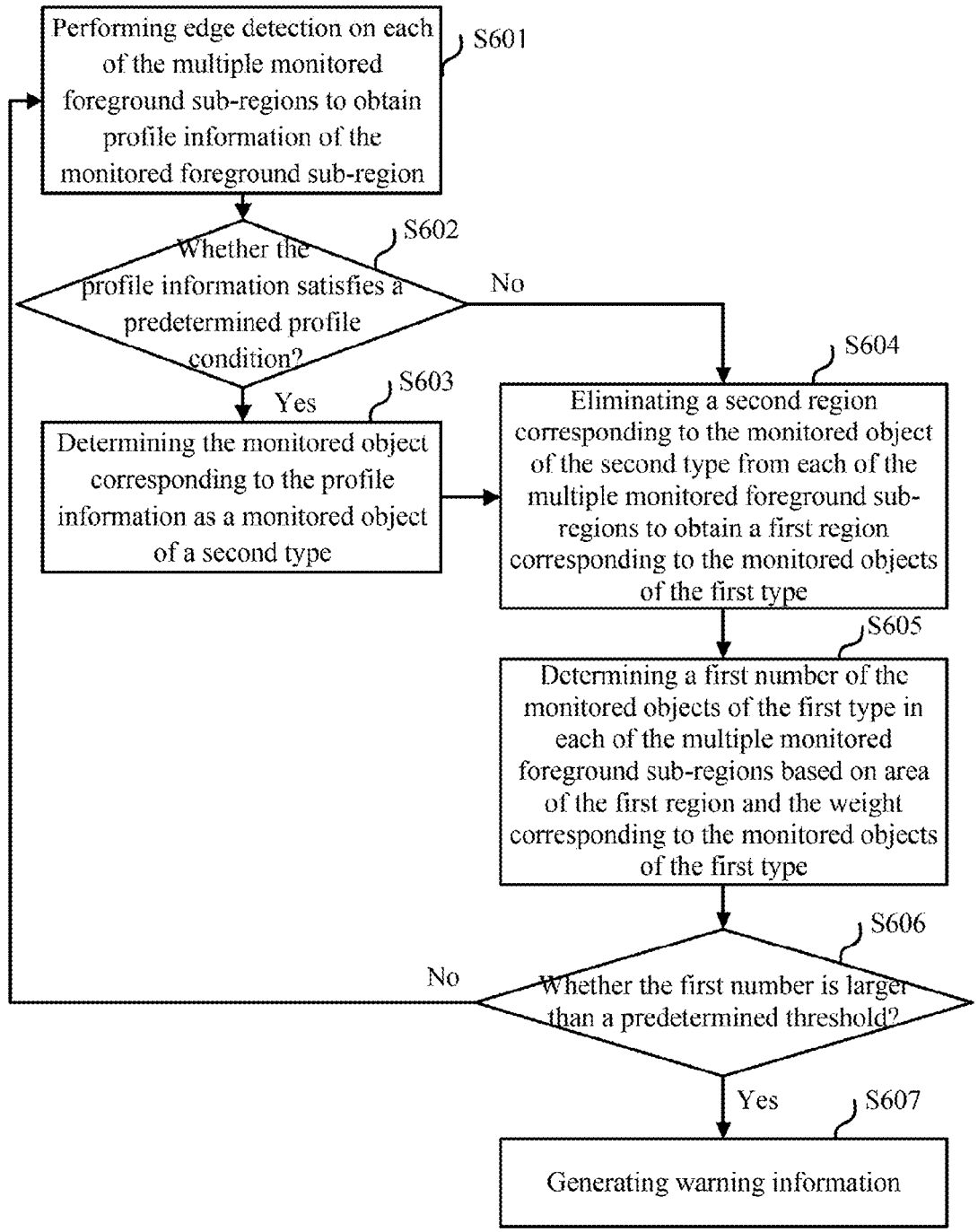
FIG. 6 is a flowchart for further illustrating statistics of the number of the monitored objects in a video monitoring method according to an embodiment of the present disclosure.

FIG. 6 is a flowchart for further illustrating statistics of the number of the monitored objects in a video monitoring method according to an embodiment of the present disclosure. As shown in FIG. 6, the operation flow of performing statistics of the number of the monitored objects in a video monitoring method according to an embodiment of the present disclosure comprises the following steps.

In step S601, edge detection on each of the multiple monitored foreground sub-regions is performed to obtain profile information of the monitoring foreground sub-region. In an embodiment of the present disclosure, for example, the profile information in each of the multiple monitoring sub-regions $52_1$, $52_2$ and $52_3$ can be obtained by using for example Hough transformation processing, that is, finding the lines in the monitoring foreground sub-regions. Then, the process enters step S602.

In step S602, it is determined whether the profile information satisfies a predetermined profile condition. In an embodiment of the present disclosure, the predetermined profile condition can be a ratio of horizontal lines of the monitoring object in the monitoring foreground sub-region. Suppose that the passengers in the monitoring scene (the monitored objects of the first type) are standing, the lines in the passengers mainly are straight lines perpendicular to the ground. However, lines on the vehicles (the monitored objects of the second type) have long horizontal lines parallel to the ground. Therefore, it is possible to recognize whether the monitoring object in the monitoring foreground sub-regions is a passenger (the monitoring object of the first type) or a vehicle (the monitoring object of the second type) according to the ratio of horizontal lines of the monitoring object. If a positive result is obtained in the step S602, the profile information satisfies the predetermined profile condition, that is, the profile information shows that the profile has relatively long horizontal lines parallel to the ground, and then the process enters step S603.

In step S603, the monitoring object corresponding to the profile information is determined s a vehicle (the monitoring object of the second type). Further, the number of the monitored objects of the second type is incremented by 1 in the statistic counting of the monitoring object. Then, the process enters step S604.

On the contrary, if a negative result is obtained in the step S602, the profile information does not satisfies the predetermined profile condition, and the process directly enters step S604.

In step S604, a second region corresponding to the monitoring object of the second type is eliminated from each of the multiple monitored foreground sub-regions to obtain a first region corresponding to passengers (the monitored objects of the first type). Then, the process enters step S605.

In step S605, a first number of the monitored objects of the first type in each of the multiple monitored foreground sub-regions is determined based on area of the first region and the weight corresponding to the monitored objects of the first type. As described in the above, the area occupied by each passenger (the object of the first type) at the position is estimated based on the position of each of the multiple monitored foreground sub-regions according to corresponding weight determined in the step S304. It is possible to obtain the first number of passengers (the monitoring object of the first type) in each of the multiple monitored foreground sub-regions by comparing the area of the first region obtained in the step S604 with the area occupied by each passenger (the monitoring object of the first type). Then, the process enters the step S606.

In step S606, it is determined whether the first number obtained in the step S605 is larger than the predetermined threshold. The predetermined threshold can be understood as density of people with potential risk. If a positive result is obtained in the step S606, that is, the first number is larger than the predetermined threshold, the process enters step S607.

In step S607, warning information is generated. The operator of the video monitoring system according to an embodiment of the present disclosure can find potential risks in real time according to the warning information to take appropriate measures in time.

On the contrary, if a negative result is obtained in the step S606, that is, the first number is not larger than the predetermined threshold, the process returns to the step S601 to continue the real-time video monitoring process.

Figure 7:
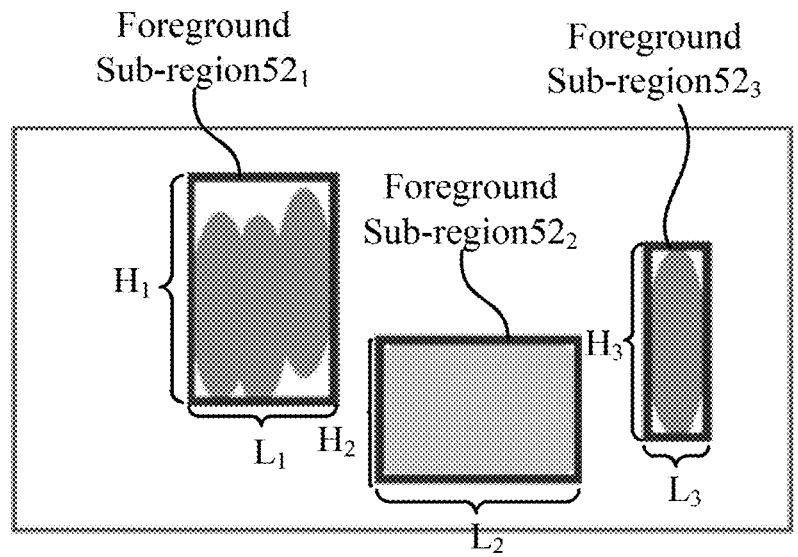
FIG. 7 is a schematic diagram for illustrating determination of types of the monitored objects in a video monitoring method according to an embodiment of the present disclosure.

FIG. 7 is a schematic diagram for illustrating determination of types of the monitored objects in a video monitoring method according to an embodiment of the present disclosure.

As shown in FIG. 7, among multiple monitored foreground sub-regions $52_1$, $52_2$ and $52_3$, only the profile information of one monitoring foreground sub-region $52_2$ shows that it has a relative long horizontal line $L_2$ parallel to the ground, and the monitoring foreground sub-region $52_2$ can be determined as having vehicles (the monitoring object of the second type). The profile information of both the monitoring foreground sub-regions $52_1$ and $52_3$ shows that they mainly are straight lines $H_1$ and $H_3$ perpendicular to the ground, and thus the monitoring foreground sub-regions $52_1$ and $52_3$ can be determined as having passengers (the monitoring object of the first type).

In addition to ability to perform statistics on the number of passengers and vehicles in the monitoring foreground sub-region, the video monitoring method according to an embodiment of the present disclosure can also perform statistics on the flow of the monitored objects.

Figure 8:
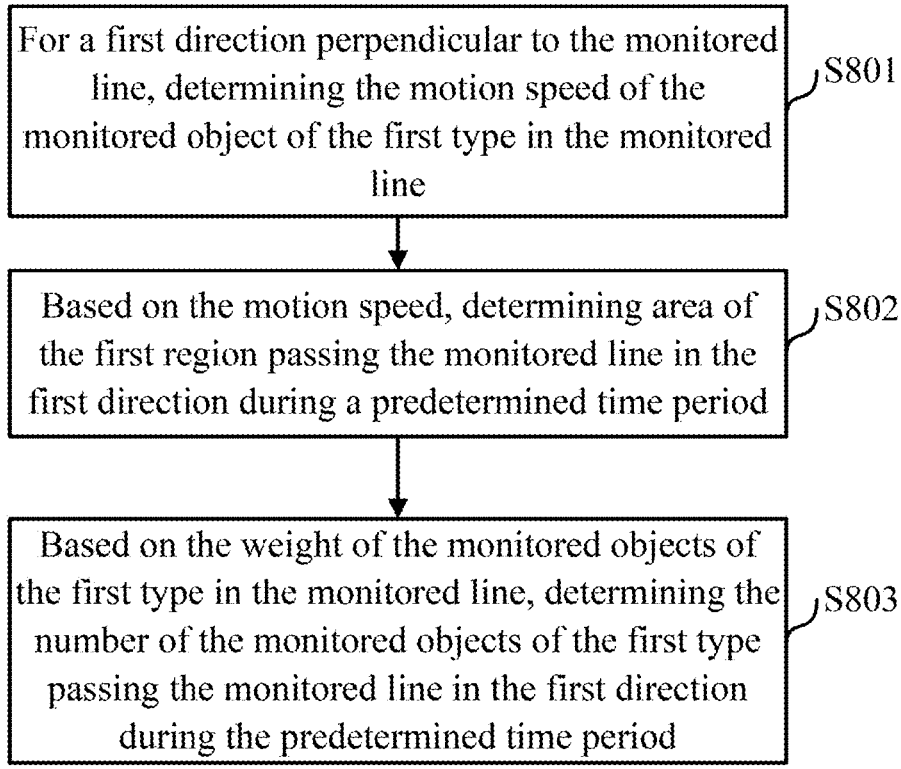
FIG. 8 is a flowchart for further illustrating flow statistics of the monitored objects in a video monitoring method according to an embodiment of the present disclosure.

FIG. 8 is a flowchart for further illustrating flow statistics of the monitored objects in a video monitoring method according to an embodiment of the present disclosure. As shown in FIG. 8, the operation flow of performing the flow statistics of the monitored objects in the video monitoring method according to an embodiment of the present disclosure comprises the following steps.

In step S801, for a first direction perpendicular to the monitored line, the motion speed of the monitoring object of the first type in the monitored line is determined. Then, the process enters step S802.

In step S802, based on the motion speed, area of the first region passing the monitored line in the first direction during a predetermined time period is determined. Then the process enters step S803.

In step S803, based on the weight of the monitored objects of the first type in the monitored line, the number of the monitored objects of the first type passing the monitored line in the first direction during the predetermined time period is determined. In particular, according to the weight of the passengers determined in this monitored line in the monitoring scene, it is possible to estimate the area size occupied averagely by the passengers in this monitored line. Then, the amounts of people flow passing the monitored line (i.e., the area of the first region passing the monitored line) from the first frame to the current frame are added and then divided by the area size occupied averagely by the passengers in this monitored line to obtain the number of passengers passing the monitored line during the predetermined time period until the current timing.

Figure 9A:
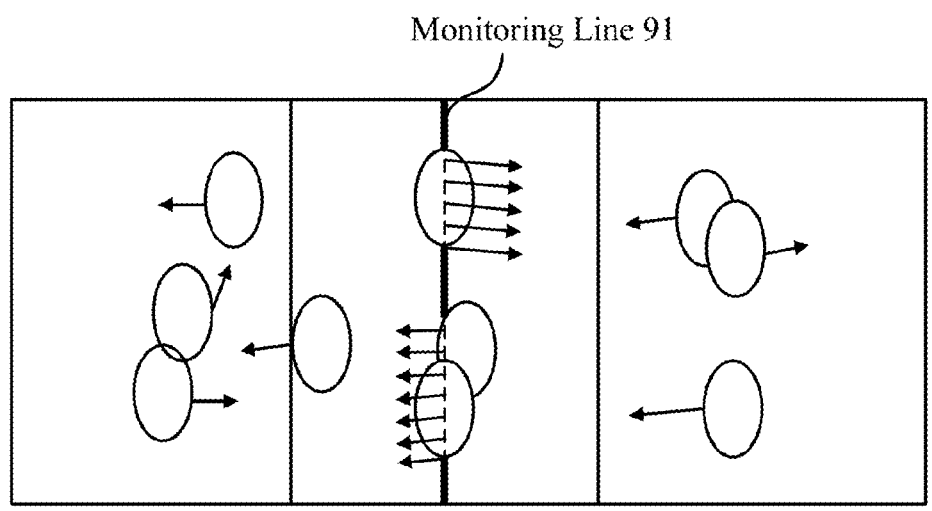
FIGS. 9A and 9B are schematic diagrams for illustrating flow statistics of the monitored objects in a video monitoring method according to an embodiment of the present disclosure.
Figure 9B:
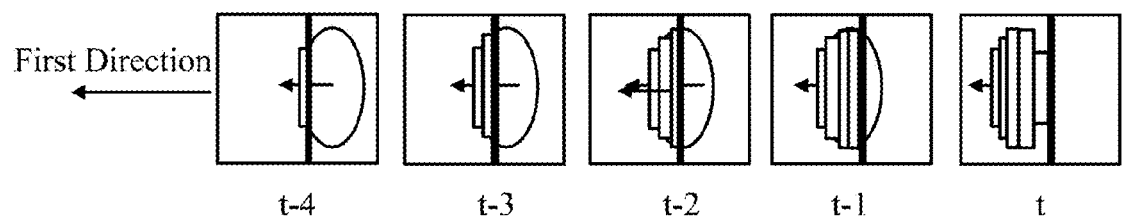

FIGS. 9A and 9B are schematic diagrams for illustrating flow statistics of the monitored objects in a video monitoring method according to an embodiment of the present disclosure.

As shown in FIG. 9A, the thick solid line in the middle frame is the monitored line 91. the passengers (the monitored objects of the first type) represented by ellipses pass the monitored line 91 in two directions (from right to left and from left to right) at each timing.

As shown in FIG. 9B, for example, only a first direction from right to left is considered, and only one passenger is schematically illustrated. The passenger has a certain speed when passing the monitored line 91. A faster speed when passing the monitored line 91 will generate a wider rectangle. The length of the rectangle is related to the width of the body of the passenger. As shown in FIG. 9B, for time from t-4 to t, the areas of all the rectangles are added to obtain the total flow area passing during the time period. In combination with the passenger weight in the monitored line 91, it is possible to determine the amount of the passenger flow passing during the time period.

Figure 10:
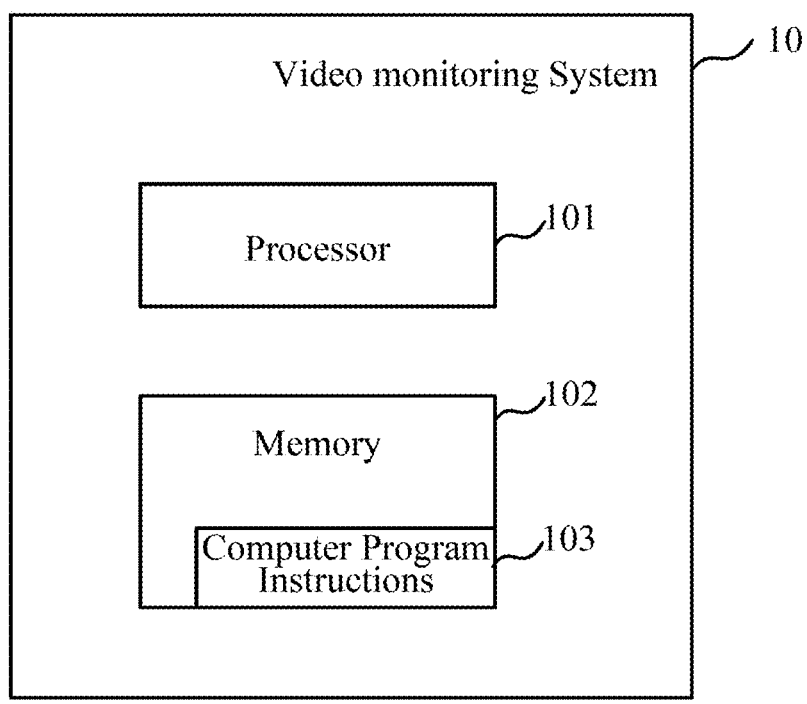
FIG. 10 is a schematic block diagram of a video monitoring system according to an embodiment of the present disclosure.

FIG. 10 is a schematic block diagram of a video monitoring system according to an embodiment of the present disclosure. As shown in FIG. 10, a video monitoring system according to an embodiment of the present disclosure comprises a processor 101, a memory 102, and computer program instructions 103 stored in the memory 102.

The computer program instructions 103 can realize functions of each functional block of the video monitoring system according to an embodiment of the present disclosure and/or perform each step of the video monitoring method according to an embodiment of the present disclosure when executed by the processor 101.

In particular, the computer program instructions 103, when executed by the processor 101, perform steps of obtaining video data collected by a video data collecting apparatus; and based on pre-set scene information and the video data, performing determination and statistics of monitored objects in a scene to be monitored corresponding to the scene information.

Further, the computer program instructions 103, when executed by the processor 101, further perform a step of: generating warning information when the first number is larger than a predetermined threshold.

Further, the step of performing determination and statistics of monitored objects in a scene to be monitored corresponding to the scene information based on the scene information and the video data performed by the computer program instructions 103 when executed by the processor 101 further comprises: for a first direction perpendicular to the monitored line, based on the motion speed of the monitoring object of the first type in the monitored line, determining area of the first region passing the monitored line in the first direction during a predetermined time period, and based on the weight of the monitored objects of the first type in the monitored line, determining the number of the monitored objects of the first type passing the monitored line in the first direction during the predetermined time period.

Each module in the video monitoring system according to an embodiment of the present disclosure can be realized through the processor in the video monitoring system according to the embodiment of the present disclosure executing computer program instructions stored in the memory, or can be realized when computer instructions stored in the computer readable storage medium of a computer program product according to an embodiment of the present disclosure are executed by a computer.

The computer readable storage medium can be any combination of one or more computer readable storage media. For example, a computer readable storage medium comprises computer readable program codes for randomly generating a series of action instructions, and another computer readable storage medium comprises computer readable program codes for identifying human face action.

For example, the computer readable storage medium can include a storage card of a smart phone, a storage component of a pad computer, a hard drive of a personal computer, random access memory (RAM), read only memory (ROM), erasable programmable read only memory (EPROM), compact disk-read only memory (CD-ROM), USB memory, or any combination of the above storage media.

The above detailed exemplary embodiments of the present disclosure are only illustrative, but not limiting. Those skilled in the art should understand that various modifications, combinations or sub-combinations of those embodiments can be made without departing from the principle and spirit of the present disclosure, and such modifications should fall in the scope of the present disclosure.

What is claimed is:

1. A video monitoring method comprising:
   pre-setting scene information;
   obtaining video data collected by a video data collecting apparatus; and
   based on the pre-set scene information and the video data, performing determination and statistics of monitored objects in a scene to be monitored corresponding to the scene information,
   wherein pre-setting the scene information comprises marking positions of multiple monitored objects of a first type in a monitored region, and determining weight of the monitoring object of the first type in each position with respect to area of the monitored region, and
   the weight is an area occupied by the monitoring object in each position in a video image.

2. The video monitoring method according to claim 1, wherein pre-setting the scene information further comprises:
   configuring the scene to be monitored and setting the monitored region and a monitored line in the scene to be monitored.

3. The video monitoring method according to claim 2, wherein pre-setting the scene information further comprises:
   performing probability estimation on each pixel in the monitored region based on a predetermined model to obtain a probability model for each pixel for determining foreground data and background data in the video data.

4. The video monitoring method according to claim 3, further comprising:
   determining a foreground region and a background region in the monitored region based on the probability model and eliminating shadow regions in the foreground region to obtain a monitored foreground region as a monitored target.

5. The video monitoring method according to claim 4, further comprising:
   dividing the monitored foreground region into multiple monitored foreground sub-regions which are not connected to each other.

6. The video monitoring method according to claim 5, wherein performing determination and statistics of monitored objects in a scene to be monitored corresponding to the scene information based on the scene information and the video data comprises:
   performing edge detection on each of the multiple monitored foreground sub-regions to obtain profile information of the monitoring foreground sub-region, and determining the monitoring object corresponding to the profile information as a monitoring object of a second type if the profile information satisfies a predetermined profile condition.

7. The video monitoring method according to claim 6, wherein performing determination and statistics of monitored objects in a scene to be monitored corresponding to the scene information based on the scene information and the video data further comprises:
   eliminating a second region corresponding to the monitoring object of the second type from each of the multiple monitored foreground sub-regions to obtain a first region corresponding to the monitored objects of the first type, and determining a first number of the monitored objects of the first type in each of the multiple monitored foreground sub-regions based on area of the first region and the weight corresponding to the monitored objects of the first type.

8. The video monitoring method according to claim 7, further comprising:
generating warning information when the first number is larger than a predetermined threshold.

9. The video monitoring method according to claim 7, performing determination and statistics of monitored objects in a scene to be monitored corresponding to the scene information based on the scene information and the video data further comprises:
for a first direction perpendicular to the monitored line, based on the motion speed of the monitoring object of the first type in the monitored line, determining area of the first region passing the monitored line in the first direction during a predetermined time period, and based on the weight of the monitored objects of the first type in the monitored line, determining the number of the monitored objects of the first type passing the monitored line in the first direction during the predetermined time period.

10. A video monitoring system comprising:
a processor;
a memory; and
computer program instructions stored in the memory, which, when executed by the processor, perform steps of:
pre-setting scene information;
obtaining video data collected by a video data collecting apparatus; and
based on the pre-set scene information and the video data, performing determination and statistics of monitored objects in a scene to be monitored corresponding to the scene information,
wherein pre-setting the scene information comprises marking positions of multiple monitored objects of a first type in a monitored region, and determining weight of the monitoring object of the first type in each position with respect to area of the monitored region, and
the weight is an area occupied by the monitoring object in each position in a video image.

11. The video monitoring system according to claim 10, wherein the step of pre-setting the scene information further comprises:
configuring the scene to be monitored and setting the monitored region and a monitored line in the scene to be monitored.

12. The video monitoring system according to claim 11, wherein the step of pre-setting the scene information performed by the computer program instructions when executed by the processor further comprises:
performing probability estimation on each pixel in the monitored region based on a predetermined model to obtain a probability model for each pixel for determining foreground data and background data in the video data.

13. The video monitoring system according to claim 12, wherein the computer program instructions, when executed by the processor, further perform a step of:
determining a foreground region and a background region in the monitored region based on the probability model and eliminating shadow regions in the foreground region to obtain a monitored foreground region as a monitored target.

14. The video monitoring system according to claim 13, wherein the computer program instructions, when executed by the processor, further perform a step of:
dividing the monitored foreground region into multiple monitored foreground sub-regions which are not connected to each other.

15. The video monitoring system according to claim 14, wherein the step of performing determination and statistics of monitored objects in a scene to be monitored corresponding to the scene information based on the scene information and the video data performed by the computer program instructions when executed by the processor comprises:
performing edge detection on each of the multiple monitored foreground sub-regions to obtain profile information of the monitoring foreground sub-region, and determining the monitoring object corresponding to the profile information as a monitoring object of a second type if the profile information satisfies a predetermined profile condition.

16. The video monitoring system according to claim 15, wherein the step of performing determination and statistics of monitored objects in a scene to be monitored corresponding to the scene information based on the scene information and the video data performed by the computer program instructions when executed by the processor further comprises:
eliminating a second region corresponding to the monitoring object of the second type from each of the multiple monitored foreground sub-regions to obtain a first region corresponding to the monitored objects of the first type, and determining a first number of the monitored objects of the first type in each of the multiple monitored foreground sub-regions based on area of the first region and the weight corresponding to the monitored objects of the first type.

17. The video monitoring system according to claim 16, the computer program instructions, when executed by the processor, further perform a step of:
generating warning information when the first number is larger than a predetermined threshold.

18. The video monitoring system according to claim 16, the step of performing determination and statistics of monitored objects in a scene to be monitored corresponding to the scene information based on the scene information and the video data performed by the computer program instructions when executed by the processor further comprises:
for a first direction perpendicular to the monitored line, based on the motion speed of the monitoring object of the first type in the monitored line, determining area of the first region passing the monitored line in the first direction during a predetermined time period, and based on the weight of the monitored objects of the first type in the monitored line, determining the number of the monitored objects of the first type passing the monitored line in the first direction during the predetermined time period.

19. A non-transitory computer program product comprising a computer readable storage medium on which computer program instructions are stored, wherein the computer program instructions, when executed by the processor, perform steps of:
pre-setting scene information;
obtaining video data collected by a video data collecting apparatus; and based on the pre-set scene information and the video data, performing determination and statistics of monitored objects in a scene to be monitored corresponding to the scene information, wherein pre-setting the scene information comprises marking positions of multiple monitored objects of a first type in a monitored region, and determining weight of the monitoring object of the first type in each position with respect to area of the monitored region, and the weight is an area occupied by the monitoring object in each position in a video image.

\* \* \* \* \*